(No Model.)

E. W. MEYER.
CAST LEAD SERVICE BOX.

No. 281,712. Patented July 24, 1883.

Witnesses:
Henry Gidding
Geo. W. Barber

Inventor:
Edward W. Meyer
per
John Francis Meyer
Atty

UNITED STATES PATENT OFFICE.

EDWARD W. MEYER, OF NEW YORK, N. Y.

CAST-LEAD SERVICE-BOX.

SPECIFICATION forming part of Letters Patent No. 281,712, dated July 24, 1883.

Application filed April 3, 1882. (No model.)

*To all whom it may concern:*

Be it known that I, EDWARD W. MEYER, of the city, county, and State of New York, have invented certain new and useful Improvements in Cast-Lead Service-Boxes for Closet-Cisterns, of which the following is a specification.

My invention consists in providing a cast-lead service-box cast in two pieces, consisting of the lid and pan, so arranged and adapted to each other that they may be joined by a joint on the under side of the lid. The peculiar method of making this joint, as herein described, consisting of the raised bead on the under side of the lid and designed to be fused to the adjacent flange of the pan, is also part of my invention.

My invention consists, further, in providing a cast-lead service-box with a lid, without pipes for the valve and air-pipe, but provided in lieu thereof with suitable openings for joining the valve and air-pipes. The advantage of this is that pipes of various lengths adapted to different jobs may be joined, and the trouble of soldering a piece is avoided; or, where short lengths are provided and long ones required, the waste of material incidental upon casting onto the lid pipes long enough to answer for any ordinary occasion is likewise avoided.

My invention is shown in the accompanying drawings, in the several figures of which like letters indicate like parts, and in which—

Figure 1:
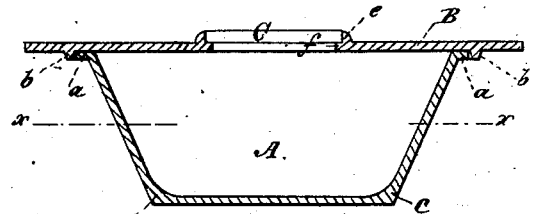
Figure 2:
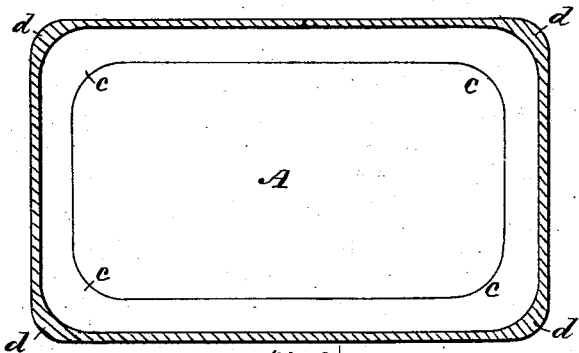
Figure 3:
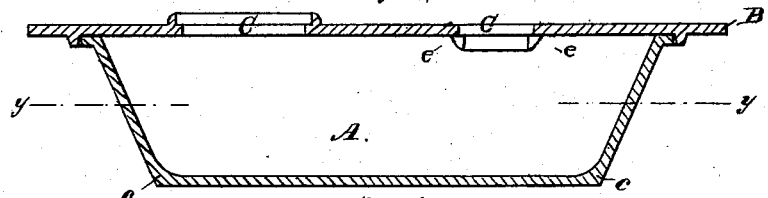
Figure 4:
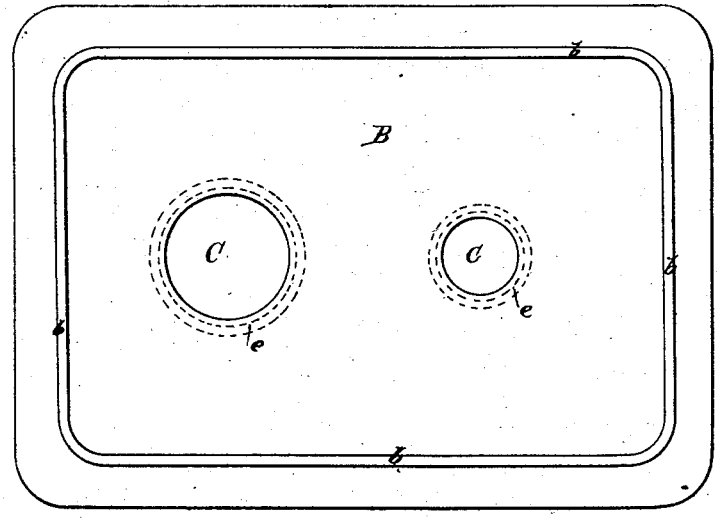

Figure 1 is a vertical and transverse section of a service-box through the opening for joining either the valve or the air-pipe. Fig. 2 is a horizontal section of a service-box through the points *x x* in Fig. 1. Fig. 3 is a vertical and longitudinal section of a service-box through the line of the openings for the valve and air-pipe. Fig. 4 is a view of the under side of the lid of a service-box, showing the openings for the insertion of a valve and air-pipe, and showing also the bead for joining the pan to the lid.

A is the pan of a service-box, having the flange *a*.

B is the lid, having on its under side the bead *b*, designed to circumscribe the flange *a* of the pan and to facilitate the joining of the lid and pan. This is done by means of a soldered joint, or, preferably, (and this is part of my invention,) by applying the blow-pipe or soldering-iron and fusing the bead and the adjacent edge of the flange *a*. One of the advantages of this method of joining the lid and pan is that a joint is secured which is tight beyond question, and the use of solder or lead, which is an item of expense, is dispensed with. This also is one way of making the joint between the lid and pan of a cast-lead box cast in two pieces, comprising the pan and lid, on the under side of the lid. The advantages of this are that the upper surface of the lid, which rests against the bottom of the tank, remains perfectly smooth, and cannot spring and strain the joints and crack the metal, as is the case with the raised joint, which is inevitable where the joint is made on the upper surface of the lid by soldering the lid into a rabbet, or otherwise.

C C are openings in the lid for joining the pipes to the same. In order to make a neater joint, I surround the opening by the shoulder *e e*, having the recess *f f*. The pipe to be joined is fitted closely within the opening, the recess serving to catch the solder and prevent it from running into the box, and also to facilitate the making of the joint, and making a neater joint than can otherwise be made, and thereby lessening the amount of cutting away of the tank to be done in letting the lid up against the tank. This shoulder, with its recess, may be placed either upon the upper or lower surface of the lid, as shown in Fig. 3. If on the lower surface, the joint may be made level and smooth with the upper surface, and the necessity of any cutting away of the tank-bottom on account of the joint avoided. I prefer this way of making the joint.

Having fully described my invention, what I claim, and desire to secure by Letters Patent, is—

1. The improved cast-lead service-box, consisting of the lid B, having suitable valve and air-pipe openings, and provided with the raised fusible bead *b*, and the pan A, provided with the flange *a*, the said lid and pan being adapted to be joined together by fusing said bead to said flange.

2. The lid of a cast-lead service-box, provided with openings for joining the valve and air-pipe, said openings having the shoulder *e*, with the recess *f*, to facilitate the joining of the valve and air-pipe.

EDWARD W. MEYER.

Witnesses:
JOHN F. MEYER,
GEO. W. LORD.